(12) United States Patent
Destarac

(10) Patent No.: US 6,916,884 B2
(45) Date of Patent: Jul. 12, 2005

(54) METHOD FOR BLOCK POLYMER SYNTHESIS BY CONTROLLED RADICAL POLYMERIZATION IN THE PRESENCE OF A DISULPHIDE COMPOUND

(75) Inventor: Mathias Destarac, Paris (FR)

(73) Assignee: Rhodia Chimie, Boulogne Billancourt (FR)

(*) Notice: Subject to any disclaimer, the term of this patent is extended or adjusted under 35 U.S.C. 154(b) by 14 days.

(21) Appl. No.: 10/380,336

(22) PCT Filed: Sep. 11, 2001

(86) PCT No.: PCT/FR01/02821

§ 371 (c)(1),
(2), (4) Date: Mar. 12, 2003

(87) PCT Pub. No.: WO02/22688

PCT Pub. Date: Mar. 21, 2002

(65) Prior Publication Data

US 2003/0187165 A1 Oct. 2, 2003

(30) Foreign Application Priority Data

Sep. 18, 2000 (FR) .............................. 00 11877

(51) Int. Cl.$^7$ .............................. C08F 293/00
(52) U.S. Cl. .................. 525/261; 525/244; 525/308; 525/309; 525/314; 526/222; 526/223; 526/328; 526/346
(58) Field of Search ................. 525/244, 261, 525/308, 309, 314; 526/222, 223, 328, 346

(56) References Cited

U.S. PATENT DOCUMENTS 6,153,705 A * 11/2000 Corpart et al. ............... 525/244
6,545,098 B1 * 4/2003 Bouhadir et al. ............ 525/244
6,642,318 B1 * 11/2003 Chiefari et al. .............. 525/261
2003/0114548 A1 * 6/2003 Bett et al.

FOREIGN PATENT DOCUMENTS

| DE | 27 56218 | 6/1979 | ......... C08F/236/04 |
| DE | 156 600 | 9/1982 | ............. C08F/2/24 |
| EP | 0 348 166 | 12/1998 | ............. C09J/3/14 |
| FR | 2 764 892 | 12/1998 | ......... C08F/293/00 |
| GB | 2 204 050 | 11/1988 | ............. C08F/2/48 |
| WO | WO 98/01478 | * 1/1998 | |

OTHER PUBLICATIONS

Okawara m et al: Bulletin of the Tokyo Institue of Technology, JP, Tokyo, NR. 78, Page(s) 1016, XP002049822.

XP–002188157—JP 62 127330 A (Asahi Chem Ind Co Ltd), Jun. 9, 1987.

International Search Report.

* cited by examiner

Primary Examiner—Helen L. Pezzuto

(57) ABSTRACT

The invention concerns a method for preparing a first generation polymer comprising a step which consists in radical polymerization of a composition containing: at least an ethylenically unsaturated monomer a free radical source, and at least a disulfide compound.

14 Claims, No Drawings

METHOD FOR BLOCK POLYMER SYNTHESIS BY CONTROLLED RADICAL POLYMERIZATION IN THE PRESENCE OF A DISULPHIDE COMPOUND

This application is an application under 35 U.S.C. Section 371 of International Application Number PCT/FR01/02821 filed on Sep. 11, 2001.

The present invention relates to a novel method for free-radical polymerization which provides block polymers.

Block polymers are conventionally prepared by ionic polymerization. This type of polymerization has the drawback of allowing the polymerization of only certain types of apolar monomer, in particular styrene and butadiene, and of requiring a particularly pure reaction medium and temperatures often below ambient temperature so as to minimize parasitic reactions, hence severe operational constraints.

Free-radical polymerization has the advantage of being easily carried out without having to comply with excessive purity conditions, and at temperatures greater than or equal to ambient temperature. However, until recently, no method for free-radical polymerization existed for obtaining block polymers.

In conventional free-radical polymerization, the growing microradicals have nonselective reactivity: the chains terminate irreversibly by coupling or dismutation. Consequently, it is very difficult to control the structure of the chains. The possibilities of obtaining functional telechelic polymers or block copolymers are very limited. Recently, a new method for free-radical polymerization has been developed: this is "controlled" or "living" free-radical polymerization. Several techniques have been developed, in which the ends of polymer chains can be reactivated by virtue of a reversible termination or transfer reaction (dormant species/active species equilibrium).

Controlled free-radical polymerization has the following distinctive characteristics:

1. the number of chains is fixed throughout the duration of the reaction,
2. the chains all grow at the same rate, resulting in:
   a linear increase in the molecular masses with conversion,
   a narrow distribution of masses,
3. the average molecular mass is controlled by the monomer/chain-precursor molar ratio,
4. the possibility of preparing block copolymers.

The controlled nature is all the more pronounced when the rate of reactivation of the chains to radical is very great in view of the rate of growth of the chains (propagation). There are cases where this is not always true (i.e. the rate of reactivation of the chains to radical is less than the rate of propagation) and conditions 1 and 2 are not observed, nevertheless it is always possible to prepare block copolymers.

Recently, methods for living free-radical polymerization by thermal initiation have been developed. For example, PCT patent applications WO 98/01478 in the name of Dupont de Nemours and WO 99/35178 in the name of Rhodia Chimie describe the use of agents for reversible transfer by addition-fragmentation of the RSC=SR' dithioester type, for the synthesis of copolymers with controlled architecture. Another family of reversible transfer agents, RSC=SOR' xanthates, has been described in patent application WO 98/58974 from the company Rhodia Chimie, as precursors for block copolymers. The control of free-radical polymerization with RS(C=S)NR₁R₂ dithiocarbamates has also recently been described in patent applications WO 99/35177 in the name of Rhodia and WO 99/31144 in the name of Dupont de Nemours.

Controlled free-radical polymerization has an advantage over conventional free-radical polymerization when it comes to preparing functionalized low molecular weight chains (reactive telomers). Such polymers are desired for specific applications such as, for example, coatings and adhesives.

Thus, when seeking to synthesize chains grafted with on average 2 functional comonomers, the fraction of chains with at most one functional site becomes great when the average degree of polymerization is less than the threshold value (e.g. 20 or 30). Controlled free-radical polymerization itself makes it possible to reduce, or even inhibit, the formation of these oligomers with zero or one functional site, which degrade the performance in terms of application.

In the remainder of the description, the term "polymer" is used to describe homopolymers or copolymers, unless otherwise indicated.

In addition, the term "block polymer" is intended to mean a copolymer comprising at least two series of blocks of monomer units with different chemical constitutions. The blocks may consist of a homopolymer or of a polymer obtained from a mixture of ethylenically unsaturated monomers. In this case, the block may be a random copolymer. The block copolymer may comprise two blocks, each consisting of random copolymers. In this case, the ethylenically unsaturated monomers are such that the blocks obtained are different in nature. The expression "different in nature" is intended to mean blocks consisting of monomers of different types, but also blocks consisting of monomers of the same type but in different amounts.

An aim of the present invention is to provide a novel method for free-radical polymerization which exhibits improved effectiveness and better control of the formation of the polymer.

This aim, and others which will become apparent on reading the description, are achieved by the present invention, which relates to a method for preparing a first generation polymer, which comprises a step of free-radical polymerization of a composition comprising:

at least one ethylenically unsaturated monomer,
a source of free radicals,
at least one compound (I) of general formula (IA) or (IB):

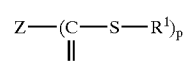

(IA)

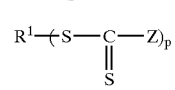

(IB)

a compound of formula (II)

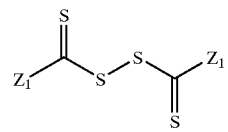

in which

R¹ represents a group chosen from alkyl, acyl, aryl, aralkyl, alkene or alkyne groups, saturated, unsaturated or aromatic carbonaceous rings or heterocycles, or a polymer chain, Z and $Z_1$, which may be identical or different, represent a group chosen from alkyl, acyl, aryl, aralkyl, alkene or alkyne groups, or saturated, unsaturated or aromatic carbonaceous rings or heterocycles, which may be substituted, the group —$OR^2$ in which $R^2$ is an alkyl, acyl, aryl, aralkyl, alkene or alkyne group, a saturated, unsaturated or aromatic carbonaceous ring or heterocycle, a polymer chain, —$CH_2C_nF_{2n+1}$ with n between 1 and 20, or a group —$CR^5R^6PO(OR^7)_2$ in which $R^5$ and $R^6$ are each separately a hydrogen atom, a halogen, an alkyl group, a heterocyclic group, a group —$NO_2$, —$SO_3R^8$, —NCO, CN, $R^8$, —$OR^8$, —$SR^8$, —$NR^8_2$, —$COOR^8$, $O_2CR^8$, —$CONR^8_2$, —$NCOR^8_2$, or $C_nF_{2n+1}$ with n between 1 and 20, $R^8$, which may be identical or different, being chosen from a group consisting of the following groups: alkyl, alkenyl, alkynyl, cycloalkenyl, cycloalkynyl, aryl, optionally condensed with an aromatic or non-aromatic heterocycle, alkaryl, aralkyl and heteroaryl, $R^8$ possibly being substituted with one or more groups, which may be identical or different, chosen from halogen, =O, =S, OH, alkoxy, SH, thioalkoxy, $NH_2$, mono- or dialkylamino, CN, COOH, ester, amide, and $C_nF_{2n+1}$ with n between 1 and 20, and/or optionally interrupted with one or more atoms chosen from O, S, N and P, or $R^5$ and $R^6$ form, together with the carbon atom to which they are attached, a group =O or =S or a hydrocarbon-based ring or a heterocycle, and $R^7$, which may be identical or different, represents a group $R^8$ as defined above or they together form a $C_2$–$C_4$ hydrocarbon-based chain optionally interrupted with a hetero atom chosen from O, S and N;

the group —$NR^3R^4$ in which $R^3$ and $R^4$, which may be identical or different, are chosen from optionally substituted alkyl, acyl, aryl, aralkyl, alkene or alkyne groups, and saturated, unsaturated or aromatic carbonaceous rings or heterocycles, which may be substituted, and $R^3$ and $R^4$ together form an optionally substituted ring containing at least 5 members, with the additional condition that $R^3$ and $R^4$ induce a delocalizing or electron-withdrawing effect with respect to the electron density of the nitrogen atom, p is an integer greater than or equal to 1.

The invention also relates to a method for preparing a block polymer, and to the compositions which can be obtained using one or other of the methods of the invention.

An advantage of the method of the invention is that it makes it possible, for relatively inactive monomer-compound (I) systems, to render virtually linear the evolution of the molecular mass (Mn) as a function of the monomer conversion rate. It is thus possible to obtain, for low conversion rates, low molecular masses without, however, increasing the compound (I)/monomer molar ratio.

Another advantage is that compound (II) which is of use in the method of the invention makes it possible to accelerate the consumption of compound (I) undergoing reaction. This method is particularly advantageous when compound (I) exhibits low reactivity with respect to the monomer used.

Specifically, for relatively inactive monomer-compound (I) systems, the resulting polymer composition contains a residual amount of compound (I). The presence of this residual amount of compound (I) disturbs the subsequent formation of a block copolymer. It is therefore particularly advantageous to have a method of synthesis which makes it possible to reduce the residual amount of compound (I) in the polymer composition obtained.

The groups $R^1$, $R^2$, $R^3$, $R^4$, $R^5$, $R^6$, $R^7$, $R^8$, Z and $Z^1$ may be linear or branched, substituted or unsubstituted groups. The substituents may be chosen from phenyl groups, aromatic groups, saturated or unsaturated carbonaceous rings, saturated or unsaturated heterocycles, or groups consisting of the following groups: alkoxycarbonyl or aryloxycarbonyl (—COOR), carboxy (—COOH), acyloxy (—$O_2CR$), carbamoyl (—$CONR_2$), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—$NR_2$), halogen, perfluoroalkyl $C_nF_{2n+1}$, allyl, epoxy, alkoxy (—OR), S-alkyl or S-aryl, or groups exhibiting a hydrophilic or ionic nature, such as alkali metal salts of carboxylic acids, alkali metals salts of sulfonic acid, poly(alkylene oxide) (PEO, PPO) chains or cationic substituents (quaternary ammonium), R representing an alkyl or aryl group, or a polymer chain.

In the compound (I) of general formula (IA) or (IB), p is preferably between 1 and 10, preferably between 1 and 5. When p is greater than 1, then the groups $R^1$ and/or Z may be identical or different.

According to a particular embodiment, $R^1$ is an alkyl group, preferably substituted. The group $R^1$ is, for example, chosen from the following substituted alkyl groups:

$CH_2C_6H_5$ $CH(CH_3)(CO_2Et)$ $CH(CH3)CO2Me)$ $CH(CH_3)(C_6H_5)$ $CH(CO_2Et)_2$ $C(CH_3)(CO_2Et)(S—C_6H_5)$ $C(CH_3)_2(C_6H_5)$ $C(CH_3)_2CN$

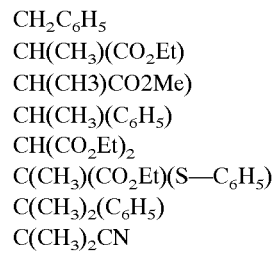

in which Et represents an ethyl group, Me a methyl group and Ph a phenyl group.

When $R^1$ is a polymer chain, this polymer chain may be derived from a free-radical polymerization or ionic polymerization or derived from a polycondensation.

According to a particular embodiment, the compound (I) is such that the group Z is chosen from the groups consisting of the following groups: alkyl, —$OR^2$, $R^2$ being an alkyl group comprising from 1 to 20 carbon atoms, an aryl group, an aralkyl group or a group —$CH_2C_nF_{2n+1}$ with n between 1 and 20; —$NR^3R^4$ in which $R^3$ and $R^4$, which may be identical or different, are an alkyl group comprising from 1 to 20 carbon atoms.

According to a particularly preferred embodiment, the compounds (I) exhibit a reactivity with respect to the monomer such that the compound (I) exhibits a transfer constant (Ctr) of less than 10 with respect to the monomer.

The transfer constant (Ctr) is defined as the ratio of the rate constants for transfer and for propagation at zero conversion of compound (I) and of monomer. The transfer constant can be measured by Mayo's law as described in J. Am. Chem. Soc., 65, 2324 (1943).

In the method of the present invention, the transfer constant for the compound (I) with respect to the monomer is preferably less than 1. Such compounds are, for example, monomer/compound (I) systems such as the methyl methacrylate/S-propionyl O-ethyl xanthate system or the styrene/S-benzyl O-ethyl xanthate system.

The compounds (I) are readily accessible. Those in which Z is —$OR^2$ in which $R^2$ is an alkyl group, termed alkyl xanthates, can in particular be obtained by reaction between a xanthate salt, such as an alkali metal salt of the type:

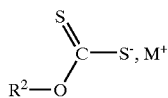

and a halogenated derivative of the type: Hal-$R^1$ with Hal chosen from Cl, Br and I.

The compounds (I) can also be obtained by the method in which:

a disulfide compound (S) of formula (A):

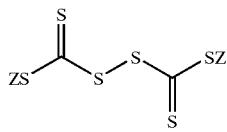

and a diazo compound of formula:

$R^1$—N=N—$R^1$ in which $R^1$ and Z are as defined above, are mixed and heated.

The amount of compound (I) depends on the molecular mass of the desired polymer according to the law $Mn_{theoretical}=[M]_0/[I]_0 \times$ conversion rate+MW(I) in which $M_0$ is the initial concentration of monomers, $[I]_0$ is the initial concentration of compound (I) and MW(I) the molecular mass of the compound (I).

The compound (II) of use is such that the groups $Z_1$ are identical or different. According to a particular embodiment, $Z_1$ is —$OR^2$ in which $R^2$ is an alkyl radical. For example, $R^2$ is a linear or branched, substituted or unsubstituted methyl, ethyl, propyl, etc. group. $Z^1$ may be —$OC_2H_5$ or —$OCH_2CF_3$.

The methods for preparing these compounds (II) are widely described in the literature. These compounds may be obtained by oxidation of the corresponding xanthate salt $Z^1(C=S)S^-M^+$ with iodine.

The amount of compound (II) in the composition of use in the context of the invention may be very variable; however, an amount of compounds (II) of between 0.1 and 20 mol % relative to the number of moles of compound (I) is preferred. This amount is preferably between 1 and 10%.

The method of the invention is, in all cases, carried out in the presence of a source of free radicals, these free radicals being able to be generated by the monomer itself or by the compound (II) under the polymerization conditions. Specifically, for certain monomers, such as styrene, the free radicals making it possible to initiate the polymerization can be generated by the ethylenically unsaturated monomer itself at sufficiently high temperatures, generally above 100° C. In this case, it is not necessary to add a source of additional free radicals. The same is true with the compounds (II).

The source of free radicals of use in the method of the present invention is generally a free-radical polymerization initiator. The free-radical polymerization initiator can be chosen from the initiators conventionally used in free-radical polymerization. It may, for example, be one of the following initiators:

hydrogen peroxides such as: tert-butyl hydroperoxide, cumene hydroperoxide, tert-butyl peroxyacetate, tert-butyl peroxybenzoate, tert-butyl peroxyoctoate, tert-butyl peroxyneodecanoate, tert-butyl peroxyisobutyrate, lauroyl peroxide, tert-amyl peroxypivalate, tert-butyl peroxypivalate, dicumyl peroxide, benzoyl peroxide, potassium persulfate or ammonium persulfate, azo compounds such as: 2,2'-azobis(isobutyronitrile), 2,2'-azobis(2-butanenitrile), 4,4'-azobis(4-pentanoic acid), 1,1'-azobis(cyclohexane-carbonitrile), 2-(tert-butylazo)-2-cyanopropane, 2,2'-azobis[2-methyl-N-(1,1)-bis(hydroxymethyl)-2-hydroxyethyl]propionamide, 2,2'-azobis(2-methyl-N-hydroxyethyl]propionamide, 2,2'-azobis(N,N'-dimethyleneisobutyramidine) dichloride, 2,2'-azobis(2-amidinopropane) dichloride, 2,2'-azobis(N,N-dimethyleneisobutyramide), 2,2'-azobis(2-methyl-N-[1,1-bis(hydroxymethyl)-2-hydroxyehtyl]propionamide), 2,2'-azobis(2-methyl-N-[1,1-bis(hydroxymethyl)ethyl]propionamide), 2,2'-azobis[2-methyl-N-(2-hydroxyethyl)propionamide) or 2,2'-azobis(isobutyramide) dihydrate, redox systems comprising combinations such as:

mixtures of hydrogen peroxide or alkyl peroxide, peresters, percarbonates and the like and of any one of the salts of iron, titanous salts, zinc formaldehyde sulfoxylate or sodium formaldehyde sulfoxylate, and reducing sugars;

alkali metal or ammonium persulfates, perborates or perchlorates in combination with an alkali metal bisulfite, such as sodium metabisulfite, and reducing sugars;

alkali metal persulfates in combination with an arylphosphinic acid, such as benzenephosphonic acid and other similar acids, and reducing sugars.

According to one embodiment, the amount of initiator to be used is determined in such a way that the amount of radicals generated is at most 50 mol % relative to the amount of compound (III), preferably at most 20 mol %.

The ethylenically unsaturated monomers of use in the method of the present invention are all monomers which polymerize in the presence of the compounds (I) and (II), to give active polymer chains.

These ethylenically unsaturated monomers are, for example:

styrene and styrene derivatives such as alpha-methylstyrene or vinyltoluene vinyl esters of carboxylic acid, such as vinyl acetate, vinyl Versatate® or vinyl propionate, vinyl halides, ethylenically unsaturated monocarboxylic and dicarboxylic acids, such as acrylic acid, methacrylic acid, itaconic acid, maleic acid or fumaric acid, and monoalkyl esters of dicarboxylic acids of the type mentioned with alkanols preferably having from 1 to 4 carbon atoms and their N-substituted derivatives, amides of unsaturated carboxylic acids, such as acrylamide, methacrylamide, N-methylolacrylamide or methacrylamide, or N-alkylacrylamides, ethylenic monomers comprising a sulfonic acid group and its ammonium or alkali metal salts, for example vinylsulfonic acid, vinylbenzenesulfonic acid, alphaacrylamidomethylpropanesulfonic acid and 2-sulfoethylene methacrylate, amides of vinylamine, in particular vinylformamide or vinylacetamide, unsaturated ethylenic monomers comprising a secondary, tertiary or quaternary amino group, or a heterocyclic group containing nitrogen, such as, for example, vinylpyridines, vinylimidazole, aminoalkyl (meth) acrylates and aminoalkyl (meth)acrylamides such as dimethylaminoethyl acrylate or methacrylate, di-tert-butylaminoethyl acrylate or methacrylate, or dimethylamino methylacrylamide or methacrylamide, or zwitterionic monomers such as, for example, sulfopropyl-(dimethyl)aminopropyl acrylate, dienes, for example butadiene and chloroprene, (meth)acrylic esters, vinyl nitriles, vinylphosphonic acid and derivatives thereof.

The term "(meth)acrylic esters" denotes esters of acrylic acid and of methacrylic acid with hydrogenated or fluorinated $C_1$–$C_{12}$ alcohols, preferably $C_1$–$C_8$ alcohols. Among the compounds of this type, mentioned may be of: methyl acrylate, ethyl acrylate, propyl acrylate, n-butyl acrylate, isobutyl acrylate, 2-ethylhexyl acrylate, tert-butyl acrylate, methyl methacrylate, ethyl methacrylate, n-butyl methacrylate and isobutyl methacrylate.

The vinyl nitriles include more particularly those having from 3 to 12 carbon atoms, such as in particular acrylonitrile and methacrylonitrile.

For the preparation of a polyvinylamine block, use is preferably made, as ethylenically unsaturated monomers, of amides of vinylamine, for example vinylformamide or vinylacetamide. The polymer obtained is then hydrolyzed at acid or basic pH.

For the preparation of a poly(vinyl alcohol) block, use is preferably made, as ethylenically unsaturated monomers, of vinyl esters of carboxylic acid, such as, for example, vinyl acetate. The polymer obtained is then hydrolyzed at acid or basic pH.

The types and amounts of polymerizable monomers used according to the present invention vary as a function of the specific final application for which the polymer is intended. These variations are well known and can be readily determined by those skilled in the art.

These ethylenically unsaturated monomers may be used alone or as mixtures.

According to a particular embodiment, in the method for preparing a first generation polymer, the ethylenically unsaturated monomer corresponds to the formula $CXX'(=CV—CV')_b=CH_2$ in which V and V', which may be identical or different, represent: H, an alkyl group or a halogen, X and X', which may be identical or different, represent H, a halogen or a group $R^4$, $OR^4$, $O_2COR_4$, NHCOH, OH, $NH_2$, $NHR_4$, $N(R^4)_2$, $(R^4)_2N^+O^-$, $NHCOR^4$, $CO_2H$, $CO_2R^4$, CN, $CONH_2$, $CONHR^4$ or $CON(R^4)_2$, in which $R^4$ is chosen from alkyl, aryl, aralkyl, alkaryl, alkene or organosilyl groups which are optionally perfluorinated and optionally substituted with one or more carboxy, epoxy, hydroxyl, alkoxy, amino, halogen or sulfonic groups, and b is 0 or 1.

The polymerization may be carried out in bulk, in solution, under emulsion conditions, in dispersion or in suspension. It is preferably carried out in solution or under emulsion conditions.

The method is preferably carried out semi-continuously.

The compound (II) may be present in the polymerization medium from the start of the reaction. It may also be added during the polymerization.

The temperature may range between ambient temperature and 150° C., depending on the nature of the monomers used.

In general, during the polymerization, the immediate content of polymer relative to the immediate amount of monomer and polymer is between 50 and 99% by weight, and preferably between 75 and 99%, even more preferentially between 90 and 99%. This content is maintained, in a known manner, by controlling the temperature and the rate of addition of the reagents and, optionally, of the polymerization initiator.

Generally, the method is carried out in the absence of a UV source, by thermal initiation.

The method of the invention can be carried out using a mixture of ethylenically unsaturated monomers. In this case, a random first generation polymer is obtained. By selecting monomers of specific nature, for example hydrophilic monomers and hydrophobic monomers, and the amount of each of these monomers in the block, a block is obtained which has particular properties. This procedure is particularly advantageous when the first generation polymer thus obtained is an intermediate in the preparation of a block copolymer.

Using the composition of the present invention containing a compound (I) of formula (IA) or (IB) with p equal to 1, and ethylenically unsaturated monomers corresponding to the formula $CXX'(=CV—CV')_b=CH_2$, defined above, a first generation polymer is obtained of formula (P1):

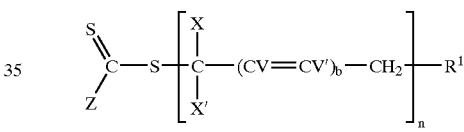

with n greater than or equal to 1, Z, X, X', V, V', b and $R^1$ being as defined above.

The present invention also relates to a method for preparing an Nth generation block copolymer by free-radical polymerization, N being greater than or equal to 2, which comprises:

a first step of free-radical polymerization obtained using a composition comprising
  at least one ethylenically unsaturated monomer,
  a source of free radicals,
  at least one compound (I) of general formula (IA) or (IB), a number N–1 of free-radical polymerization steps, each of these steps being carried out using a composition comprising:
  at least one ethylenically unsaturated monomer,
  a source of free radicals, and
  the polymer obtained in the preceding polymerization step, the ethylenically unsaturated monomer(s) in each of the steps being such that the block formed in a step is different in nature from the block formed in the preceding step, and the first polymerization step and/or the subsequent polymerization steps are carried out in the presence of at least one compound of formula (II).

For example, a second generation block copolymer can be obtained by a method which comprises the free-radical polymerization of a composition comprising:

at least one ethylenically unsaturated monomer, a source of free radicals, and the first generation polymer obtained by free-radical polymerization of the composition containing a source of free radicals, the compounds (I) and (II) and an ethylenically unsaturated monomer, the ethylenically unsaturated monomers which allow the second block to be obtained being such that the block is different in nature from the first generation polymer.

According to one embodiment of the invention, (1) a first generation polymer is synthesized using a composition comprising one or more ethylenically unsaturated monomers, a source of free radicals, a compound of formula (IA) and/or (IB) and a compound (II), and then (2) the first generation polymer obtained in step (1) is used to prepare a (second generation) diblock copolymer by bringing this first generation polymer into contact with one or more ethylenically unsaturated monomers and a source of free radicals, the block obtained in step (2) being different in nature from the first generation polymer of step (1). According to a particular embodiment, step (2) can be carried out in the presence of the compound (II).

This step (2) can be repeated with further monomers and the diblock copolymer obtained, so as to synthesize a new block and obtain a triblock copolymer.

It is thus possible to repeat as many times as necessary the polymerization step using a block copolymer so as to obtain a copolymer with an additional block.

The method of the invention makes it possible in particular to obtain a diblock copolymer of general formula (P2):

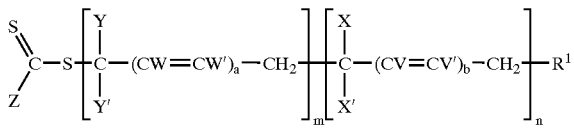

using a composition containing a source of free radicals, a polymer (P1) as defined above and an ethylenically unsaturated monomer of formula CYY'(=CW—CW')$_a$=CH$_2$, in which
  n and m, which may be identical or different, are greater than or equal to 1,
  W and W', which may be identical or different, represent: H, an alkyl group or a halogen,
  Y and Y', which may be identical or different, represent H, a halogen or a group R$^4$, OR$^4$, O$_2$COR$^4$, NHCOH, OH, NH$_2$, NHR$^4$, N(R$^4$)$_2$, (R$^4$)$_2$N$^+$O$^-$, NHCOR$^4$, CO$_2$H, CO$_2$R$^4$, CN, CONH$_2$, CONHR$^4$ or CON(R$^4$)$_2$, in which R$^4$ is chosen from alkyl, aryl, aralkyl, alkaryl, alkene or organosilyl groups which are optionally perfluorinated and optionally substituted with one or more carboxy, epoxy, hydroxyl, alkoxy, amino, halogen or sulfonic groups, and
  a and b, which may be identical or different, equal 0 or 1,
  V, V', X, X', Z, Z$^1$ and R$^1$ are as defined above.

The ethylenically unsaturated monomers which are of use are those described above.

The method above is described based on a polymer (P1) obtained using a compound (I) with p equal to 1; however, this teaching is directly applicable to the polymers obtained using the compounds (I) of formula (IA) and/or (IB) with p greater than 1.

The compounds of formula (IA) and (IB) when p is greater than 1 are particularly advantageous since they make it possible to increase a polymer chain on at least two active sites. With this type of compound, it is possible to economize on the polymerization steps to obtain a copolymer comprising n blocks. Thus, if p equals 2 in the formula (IA) or (IB), the first block is obtained by polymerization of a monomer M1 in the presence of the compound of formula (IA) or (IB). This first block can then grow at each of its ends by polymerization of a second monomer M2. A triblock copolymer is obtained, and this triblock copolymer can, itself, grow at each of its ends by polymerization of a third monomer M3. Thus, a "pentablock" copolymer is obtained in only three steps. If p is greater than 2, the method makes it possible to obtain block copolymers or homopolymers with a "multiarm" or star structure.

According to this method for preparing block polymers, when it is desired to obtain polymers comprising blocks which are homogeneous and not comprising a composition gradient, and if all the successive polymerizations are carried out in the same reactor, it is essential for all the monomers used during a step to have been consumed before the polymerization of the subsequent step begins, and therefore before the new monomers are introduced.

When it is desired to obtain a random block, the polymerization step is carried out with a composition containing a mixture of ethylenically unsaturated monomers.

The polymers obtained according to the method of the invention exhibit a low polydispersity index and a controlled molecular mass. The polydispersity index is at most 2, preferably at most 1.5.

According to a particular embodiment, the block polymers comprise at least two polymer blocks chosen from the following combinations:
  polystyrene/poly(methyl acrylate),
  polystyrene/poly(ethyl acrylate),
  polystyrene/poly(tert-butyl acrylate),
  poly(ethyl acrylate)/poly(vinyl acetate),
  poly(butyl acrylate)/poly(vinyl acetate),
  poly(tert-butyl acrylate)/poly(vinyl acetate).

One of the blocks may also consist of a random copolymer obtained using a mixture of ethylenically unsaturated monomers.

According to a particular embodiment, a diblock copolymer containing a homopolymer block and a second, random copolymer block is prepared, in a single step, by introducing a second monomer into the reaction medium while the first monomer has not been completely consumed, the addition of the second monomer being carried out after complete consumption of the compound (I).

This embodiment is particularly advantageous with the method of the invention which makes it possible, by virtue of the presence of the compound (II), to increase the rate of consumption of the compound (I).

According to a particular embodiment, the reactive ends of the block polymer can be cleaved to form a polymer whose ends are thiols or hydrogen atoms. These modifications can be carried out by reduction and/or hydrolysis.

The following examples illustrate the invention without, however, limiting the scope thereof.

EXAMPLES

In the subsequent examples, the molecular mass $M_n$ is measured by gel permeation chromatography (GPC). a–the theoretical number-average mass $M_{n\ th}$ is equal to $([M]_0/[A]_0) \times conversion + MW(A)$, in which $[M]_0$ is the initial concentration of monomer, $[A]_0$ is the initial concentration of xanthate A, MW(A) is the molecular mass of A. $M_{n\ th}$ describes a complete consumption of the xanthate A at the start of the reaction and an insignificant contribution of the chains initiated by the free-radical initiator.

Example 1

Synthesis of S-propionyl O-ethyl xanthate $CH_3CH(CO_2CH_3)S(C=S)OEt$ (A)

5 g (0.04 mol) of methyl chloropropionate $CH_3CH(CO_2CH_3)Cl$ are dissolved in 10 ml of acetone, and 7.2 g (0.045 mol) of potassium salt of xanthic acid $EtO(C=S)S^-K^+$ are added portionwise over 30 minutes. The reaction mixture is stirred for 1 hour. The product is then extracted with ether, and washed with an aqueous NaCl solution and then with water. The product is then dried over $MgSO_4$ and the solvent is evaporated off under vacuum. 7.5 g (88%) of product A are obtained.

Example 2

Synthesis of S-propionyl O-trifluoroethyl xanthate $CH_3CH(CO_2CH_3)S(C=S)OCH_2CF_3$ (B)

2 g (20 mmol) of trifluoroethanol in solution in 40 ml of DMF are placed in a glass round-bottomed flask. 2.4 ml (40 mmol) of $CS_2$ are added. The solution is cooled to 0° C., and then 0.96 g (20 mmol) of NaH is added. After stirring for 1 hour at 0° C., 2.34 ml (18 mmol) of 2-ethyl bromopropionate are added. The solution is stirred for 1 hour at 0° C., and then for two hours at ambient temperature, before being diluted with ethyl ether. It is then washed with water and then with brine. The organic phase is concentrated under vacuum, and then the reaction crude is column purified (9/1: heptane/ethyl acetate). 3.4 g (69% yield) of xanthate B is isolated.

Example 3

Synthesis of bis-O-ethyl xanthate ($D_A$)

3 g (0.019 mol) of potassium salt of xanthic acid $EtO(C=S)S^-K^+$ are dissolved in 30 ml of anhydrous THF. 2.4 g (0.0095 mol) of $I_2$ are then added portionwise at 0° C. The reaction medium is stirred for 2 hours and the product is extracted with ether, and washed with a solution of $Na_2SO_4$, then with an aqueous NaCl solution, and then with water. After drying with $MgSO_4$ and evaporation of the solvent under vacuum, 2.1 g (93%) of bis-O-ethyl xanthate are isolated.

Example 4

Synthesis of bis-O-trifluoroethyl xanthate ($D_B$)

3 g (0.014 mol) of $CF_3CH_2O(C=S)S^-K^+$ are dissolved in 30 ml of anhydrous THF. 1.96 g (0.007 mol) of $I_2$ are then added portionwise at 0° C. The reaction medium is stirred for 2 hours and the product is extracted with ether, and washed with a solution of $Na_2SO_4$, then with an aqueous NaCl solution, and then with water. After drying with $MgSO_4$ and evaporation of the solvent under vacuum, 1.54 g of pure product (63%) are harvested by column chromatography (eluent: heptane).

Example 5

Polymerization of Ethyl Acrylate in the Presence of A 0.146 g (0.7 mmol) of A (S-propionyl O-ethyl xanthate), 3.4 mg (0.02 mmol) of AIBN (azobisisobutyro-nitrile) and 5.5 g (55 mmol) of ethyl acrylate are dissolved in 6 ml of toluene. Fractions of this stock solution are distributed into Carius tubes. The content of these tubes is degassed by three successive cycles of "freezing-vacuum-return to ambient temperature". The tubes are then flame-sealed under vacuum. The tubes are then placed in a thermostatic bath at 80° C. They are withdrawn at regular time intervals, then opened and their content is analyzed.

The table below gives the evolution of the number-average molar mass ($M_n$) and also the polymolecularity index ($M_w/M_n$) as a function of the monomer conversion.

| | Conversion (%) | $M_n$ (g/mol) | $M_{n\ th}$ (g/mol)[a] | $M_w/M_n$ |
|---|---|---|---|---|
| 1 | 4.4 | 5 130 | 560 | 1.71 |
| 2 | 11.6 | 5 710 | 1 140 | 1.81 |
| 3 | 18.2 | 6 060 | 1 670 | 1.70 |
| 4 | 41 | 6 745 | 3 490 | 1.72 |
| 5 | 96.5 | 7 290 | 7 940 | 1.77 |

Example 6

Polymerization of Ethyl Acrylate in the Presence of A and of $D_A$ (2%)

The procedure of example 5 is repeated, in which 3.41 mg (0.014 mmol) of bis-O-ethyl xanthate $D_A$ are added to the stock solution (2 mol % relative to compound A). The results obtained are given in the table below:

| | Conversion (%) | $M_n$ (g/mol) | $M_{n\ th}$ (g/mol)[a] | $M_w/M_n$ |
|---|---|---|---|---|
| 1 | 4.1 | 3 600 | 540 | 2.37 |
| 2 | 10.2 | 4 000 | 1 020 | 2.14 |
| 3 | 14.4 | 4 100 | 1 360 | 2.25 |
| 4 | 45.7 | 5 200 | 3 870 | 2.11 |
| 5 | 76.7 | 7 050 | 6 350 | 1.89 |

Example 7

Polymerization of Ethyl Acrylate in the Presence of A and of $D_A$ (5%)

The procedure of example 5 is repeated, in which 8.53 mg (0.035 mmol) of bis-O-ethyl xanthate $D_A$ are added to the stock solution (5 mol % relative to xanthate A). The results are given in the table below:

| | Conversion (%) | $M_n$ (g/mol) | $M_{n\ th}$ (g/mol)[a] | $M_w/M_n$ |
|---|---|---|---|---|
| 1 | 2.6 | 2 340 | 420 | 2.66 |
| 2 | 11.9 | 2 880 | 1 160 | 2.66 |
| 3 | 77.4 | 6 232 | 6 410 | 1.93 |

Example 8

Polymerization of Ethyl Acrylate in the Presence of A and of $D_A$ (10%)

The procedure of example 5 is repeated, in which 17.06 mg (0.070 mmol) of bis-O-ethyl xanthate $D_A$ are added to the stock solution (10 mol % relative to xanthate A). The results are given in the table below:

| | Conversion (%) | $M_n$ (g/mol) | $M_{n\,th}$ (g/mol)$^a$ | $M_w/M_n$ |
|---|---|---|---|---|
| 1 | 1.9 | 1 960 | 360 | 2.39 |
| 2 | 10.1 | 3 100 | 1 020 | 2.35 |
| 3 | 25.7 | 4 800 | 2 270 | 2.01 |
| 4 | 71.8 | 5 900 | 5 960 | 1.88 |

Example 9

Polymerization of Ethyl Acrylate in the Presence of A and $D_A$ (20%)

Example 5 is repeated, in which 34.1 mg (0.14 mmol) of bis-O-ethyl xanthate $D_A$ are added to the stock solution (20 mol % relative to xanthate A). The results are given below:

| | Conversion (%) | $M_n$ (g/mol) | $M_{n\,th}$ (g/mol)$^a$ | $M_w/M_n$ |
|---|---|---|---|---|
| 1 | 2 | 1 710 | 370 | 2.15 |
| 2 | 5.9 | 2 460 | 680 | 2.05 |
| 3 | 15.7 | 2 900 | 1 470 | 2.23 |

Based on the results described in examples 5 to 9, it is clearly apparent that addition of $D_A$ makes it possible to obtain a more controlled $M_n$ evolution profile (closer to the theoretical profile), all the more so the greater the amount of $D_A$ added. $D_A$ activates the consumption of xanthate A and therefore the creation of the polymer chains generated by A.

Example 10

Polymerization of Styrene in the Presence of A 0.146 g (0.7 mmol) of A and 5.87 g (56.4 mmol) of styrene are dissolved in 6.45 ml of toluene. Fractions of this stock solution are distributed in Carius tubes. The content of these tubes is degassed by three successive cycles of "thawing-vacuum-return to ambient temperature". The tubes are then flame-sealed under vacuum. The tubes are then placed in a thermostatic bath at 110° C. They are withdrawn at regular time intervals, then opened and their content is analyzed.

The table below gives the evolution of the number-average molar mass ($M_n$) and of the polymolecularity index ($M_w/M_n$) as a function of the monomer conversion.

| | Conversion (%) | $M_n$ (g/mol) | $M_{n\,th}$ (g/mol)$^a$ | $M_w/M_n$ |
|---|---|---|---|---|
| 1 | 10.2 | 7 970 | 1 060 | 2.03 |
| 2 | 21 | 7 790 | 1 960 | 2.09 |
| 3 | 34 | 8 030 | 3 040 | 2.05 |
| 4 | 49 | 8 250 | 4 290 | 1.97 |
| 5 | 76.3 | 8 150 | 6 570 | 2.01 |

Example 11

Polymerization of Styrene in the Presence of A and of $D_A$ (5%)

The procedure of example 10 is repeated, in which 8.53 mg (0.035 mmol) of bis-O-ethyl xanthate $D_A$ are added to the stock solution (5 mol % relative to xanthate A). The results are given below:

| | Conversion (%) | $M_n$ (g/mol) | $M_{n\,th}$ (g/mol)$^a$ | $M_w/M_n$ |
|---|---|---|---|---|
| 1 | 12.6 | 3 400 | 1 260 | 3.05 |
| 2 | 45 | 5 400 | 3 960 | 2.73 |
| 3 | 48.8 | 6 400 | 4 280 | 2.44 |
| 4 | 92.5 | 8 100 | 7 930 | 2.06 |

Based on the results described in examples 10 and 11, it is clearly apparent that addition of $D_A$ makes it possible to obtain a more controlled $M_n$ evolution profile (closer to the theoretical profile). Comparison of the tables of examples 10 and 11 for low conversion rates shows that addition of 5% of $D_A$ makes it possible to accelerate the creation of the chains derived from A (the chains are created approximately twice as quickly based on the values for $M_n$).

Example 12

Polymerization of Ethyl Acrylate in the Presence of B 0.190 g (0.69 mmol) of B, 3.4 mg (0.02 mmol) of AIBN and 5.5 g (55 mmol) of ethyl acrylate are dissolved in 6 ml of toluene. Fractions of this stock solution are distributed into Carius tubes. The content of these tubes is degassed by three successive cycles of "thawing-vacuum-return to ambient temperature". The tubes are then flame-sealed under vacuum. The tubes are then placed in a thermostatic bath at 80° C. They are withdrawn at regular time intervals, then opened and their content is analyzed.

The table below gives the evolution of the number-average molar mass ($M_n$) and of the polymolecularity index ($M_w/M_n$) as a function of the monomer conversion.

| | Conversion (%) | $M_n$ (g/mol) | $M_{n\,th}$ (g/mol)$^a$ | $M_w/M_n$ |
|---|---|---|---|---|
| 1 | 4.2 | 2 790 | 610 | 1.98 |
| 2 | 11 | 2 940 | 1 160 | 2.00 |
| 3 | 25.7 | 3 600 | 2 330 | 1.81 |

Example 13

Polymerization of Ethyl Acrylate in the Presence of B and of $D_B$ (5%)

The procedure of example 12 is repeated, in which 12 mg (0.034 mmol) of bis-O-ethyl xanthate $D_B$ are added to the stock solution (5 mol % relative to xanthate B). The results are given in the table below:

| | Conversion (%) | $M_n$ (g/mol) | $M_{n\,th}$ (g/mol)$^a$ | $M_w/M_n$ |
|---|---|---|---|---|
| 1 | 0.9 | 1 830 | 350 | 1.78 |
| 2 | 1.3 | 1 800 | 380 | 1.87 |
| 3 | 4.1 | 1 960 | 605 | 1.96 |

Based on the results described in examples 12 and 13, it is clearly apparent that addition of $D_B$ makes it possible to obtain a more controlled $M_n$ evolution profile (closer to the theoretical profile). For a comparable conversion rate (approximately 4%), $M_n$ is closer to the theoretical values in the presence of $D_B$.

What is claimed is:

1. A method for preparing a first generation polymer, comprising the steps of:
   a) carrying out a free-radical polymerization of a composition comprising:
      at least one ethylenically unsaturated monomer,
      a source of free radicals,
      at least one compound (I), having a transfer constant with respect to the monomer of less than 10, of general formula (IA) or (IB):

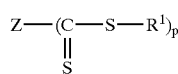  (IA)

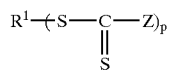  (IB)

a compound of formula (II)

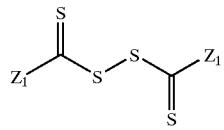

wherein:
   $R^1$ is alkyl, acyl, aryl, aralkyl, alkene, alkyne, saturated carbonaceous ring, unsaturated carbonaceous ring, aromatic, heterocycle, or a polymer chain,
   Z and $Z_1$, which are identical or different, is
      alkyl, acyl, aryl, aralkyl, alkene, alkyne, saturated carbonaceous ring, unsaturated carbonaceous ring, aromatic, heterocycle, optionally substituted,
      a group —$OR^2$ wherein $R^2$ is alkyl, acyl, aryl, aralkyl, alkene, alkyne, saturated carbonaceous ring, unsaturated carbonaceous ring, aromatic, heterocycle, a polymer chain, —$CH_2C_nF_{2n+1}$ with n between 1 and 20, a group —$CR^5R^6PO(OR^7)_2$ wherein $R^5$ and $R^6$ are each separately a hydrogen atom, a halogen, an alkyl group, a heterocyclic group, a group —$NO_2$, —$SO_3R^8$, —NCO, CN, $R^8$, —$OR^8$, —$SR^8$, —$NR^8_2$, —$COOR^8$, $O_2CR^8$, —$CONR^8_2$, —$NCOR^8_2$, or $C_nF_{2n+1}$ with n between 1 and 20, $R^8$, which are identical or different, are alkyl, alkenyl, alkynyl, cycloalkenyl, cycloalkynyl, aryl, optionally condensed with an aromatic or nonaromatic heterocycle, alkaryl, aralkyl and heteroaryl, $R^8$ optionally being substituted with one or more groups, which are identical or different, selected from the group consisting of halogen, =O, =S, OH, alkoxy, SH, thioalkoxy, $NH_2$, mono- or dialkylamino, CN, COOH, ester, amide, and $C_nF_{2n+1}$ with n between 1 and 20, optionally interrupted with one or more atoms chosen from O, S, N and P, or $R^5$ and $R^6$ form, together with the carbon atom to which they are attached, a group =O or =S or a hydrocarbon-based ring or a heterocycle, and $R^7$, which are identical or different, represent a group $R^8$ as defined above or they together form a $C_2$–$C_4$ hydrocarbon-based chain optionally interrupted with a hetero atom chosen from O, S and N;
      a group —$NR^3R^4$ wherein $R^3$ and $R^4$, which are identical or different, alkyl, acyl, aryl, aralkyl, alkene, alkyne, saturated carbonaceous ring, unsaturated carbonaceous ring, aromatic, heterocycle, optionally substituted, and $R^3$ and $R^4$ together form an optionally substituted ring containing at least 5 members, with the additional condition that $R^3$ and $R^4$ induce a delocalizing or electron-withdrawing effect with respect to the electron density of the nitrogen atom, and
   p is an integer greater than or equal to 1.

2. The method as claimed in claim 1, wherein compound (II) is present in an amount of between 0.1 and 20 mol % relative to the number of moles of compound (I).

3. The method as claimed in claim 1, wherein Z is alkyl, haloalkyl, phenyl, alkene or alkyne group.

4. The method as claimed in claim 1, wherein Z is —$OR^2$ in which $R^2$ is an alkyl group.

5. The method as claimed in claim 1, wherein Z is —$NR^3R^4$ wherein $R^3$ and $R^4$, which are identical or different, are an alkyl group.

6. The method as claimed in claim 1, wherein $R^1$ is a substituted alkyl group.

7. The method as claimed in claim 1, wherein the transfer constant for the compound (I) with respect to the monomer is less than 1.

8. The method as claimed in claim 1, wherein the ethylenically unsaturated monomer(s) correspond(s) to the formula

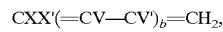

wherein:
   V and V', which are identical or different, represent: a hydrogen atom, an alkyl group or a halogen,
   X and X', which are identical or different, represent H, a halogen or a group $R^4$, $OR^4$, $O_2COR^4$, NHCOH, OH, $NH_2$, $NHR^4$, $N(R^4)_2$, $(R^4)_2N^+O^-$, $NHCOR^4$, $CO_2H$, $CO_2R^4$, CN, $CONH_2$, $CONHR^4$ or $CON(R^4)_2$, wherein $R^4$ is chosen from alkyl, aryl, aralkyl, alkaryl, alkene or organosilyl groups which are optionally perfluorinated and optionally substituted with one or more carboxy, epoxy, hydroxyl, alkoxy, amino, halogen or sulfonic groups, and
   b is 0 or 1.

9. A method for preparing an Nth generation block copolymer by free-radical polymerization, N being greater than or equal to 2, comprising the steps of:
   a) a first step of free-radical polymerization so as to form a first generation polymer using a composition comprising:
      at least one ethylenically unsaturated monomer,
      a source of free radicals, and
      at least one compound (I) of general formula (IA) or (IB),
   said step being carried out in the presence of the compound (II), and
   b) a number N−1 of free-radical polymerization steps, each of these steps being carried out using a composition comprising:
      at least one ethylenically unsaturated monomer,
      a source of free radicals, and
      the polymer obtained in the preceding polymerization step, the ethylenically unsaturated monomer(s) being such that the block formed in this step is different in nature from the block formed in the preceding step, and the first polymerization step or the subsequent polymerization steps are carried out in the presence of at least one compound of formula (II), the compounds (I) of formulae (IA), (IB) and the compounds (II) being as defined in claim 1.

10. The method as claimed in claim 9, wherein at least one of the N−1 steps is carried out in the presence of the compound (II).

11. The method as claimed in claim 9, for preparing a second generation block copolymer, which comprises the step of:

c) carrying out a free-radical polymerization of a composition comprising:
at least one ethylenically unsaturated monomer,
a source of free radicals, and
the first generation polymer.

12. The method as claimed in claim 11, wherein the ethylenically unsaturated monomer is styrene, styrene derivatives, dienes, (meth)acrylic esters, vinyl nitriles or vinyl esters.

13. The method as claimed in claim 11, wherein the second generation block copolymer comprises two blocks selected from the group consisting of:

polystyrene/poly(methyl acrylate),
polystyrene/poly(ethyl acrylate),
polystyrene/poly(tert-butyl acrylate),
poly(ethyl acrylate)/poly(vinyl acetate),
poly(butyl acrylate)/poly(vinyl acetate),
poly(ethyl acrylate)/poly(tert-butyl acrylate),
poly(tert-butyl acrylate)/poly(vinyl acetate),
poly(ethyl acrylate)/poly(butyl acrylate),
poly(butyl acrylate)/poly(vinyl alcohol), and
poly(acrylic acid)/poly(vinyl alcohol).

14. The method as claimed in claim 11, wherein the second generation copolymer comprises at least one block consisting of a random polymer obtained using a mixture of ethylenically unsaturated monomers.

* * * * *